US006944184B1

(12) United States Patent
Miller et al.

(10) Patent No.: US 6,944,184 B1
(45) Date of Patent: Sep. 13, 2005

(54) METHODS AND SYSTEMS FOR PROVIDING DATABASE NODE ACCESS CONTROL FUNCTIONALITY IN A COMMUNICATIONS NETWORK ROUTING NODE

(75) Inventors: Paul Andrew Miller, Raleigh, NC (US); Robby Darren Benedyk, Raleigh, NC (US); Venkataramaiah Ravishankar, Apex, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/537,835

(22) Filed: Mar. 29, 2000

Related U.S. Application Data

(63) Continuation-in-part of application No. 09/205,809, filed on Dec. 4, 1998, now Pat. No. 6,324,183, which is a continuation-in-part of application No. 09/443,712, filed on Nov. 19, 1999.

(60) Provisional application No. 60/127,889, filed on Apr. 5, 1999.

(51) Int. Cl.$^7$ ................................................. H04J 3/16
(52) U.S. Cl. ........................ 370/467; 370/466; 370/352
(58) Field of Search ................................ 370/352, 353, 370/354, 355, 356, 385, 465, 466, 467, 469

(56) References Cited

U.S. PATENT DOCUMENTS

| | | |
|---|---|---|
| 5,008,929 A | 4/1991 | Olsen et al. |
| 5,675,635 A | 10/1997 | Vos et al. |
| 5,694,463 A | 12/1997 | Christie et al. |
| 5,701,301 A | 12/1997 | Weisser, Jr. |
| 5,732,213 A | 3/1998 | Gessel et al. |
| 5,852,660 A | 12/1998 | Lindquist et al. |
| 5,889,954 A | 3/1999 | Gessel et al. |
| 5,926,482 A | 7/1999 | Christie et al. |
| 5,940,598 A | 8/1999 | Strauss et al. |
| 5,949,871 A | 9/1999 | Kabay et al. |
| 5,966,431 A * | 10/1999 | Reiman et al. ............. 379/115 |
| 5,995,608 A | 11/1999 | Detampel, Jr. et al. |
| 5,999,301 A | 12/1999 | Chin et al. |
| 6,011,780 A | 1/2000 | Vaman et al. |
| 6,011,794 A | 1/2000 | Mordowitz et al. |
| 6,018,515 A | 1/2000 | Sorber |
| 6,021,126 A | 2/2000 | White et al. |
| 6,026,091 A | 2/2000 | Christie et al. |
| 6,047,005 A | 4/2000 | Sherman et al. |
| 6,069,890 A | 5/2000 | White et al. |

(Continued)

FOREIGN PATENT DOCUMENTS

EP    0 853 411 A2    7/1998

(Continued)

OTHER PUBLICATIONS

Michael McGrew, "Transport SS7 Signaling Over IP," Lucent Technologies Inc., p. 1-8, (Nov. 1998).

(Continued)

*Primary Examiner*—Duc Ho
*Assistant Examiner*—Thien Tran
(74) *Attorney, Agent, or Firm*—Jenkins, Wilson & Taylor, P.A.

(57) ABSTRACT

A network element provides service control point or database node front end processing functionality, as well as routing functionality for routing data packets through a network. The network element includes a first communication module for receiving data packets from a first communication network. A second communication module transmits data packets over a second communications network. A database access control (DAC) process queries a DAC database and modifies received packets to include information returned by the database lookup.

109 Claims, 11 Drawing Sheets

U.S. PATENT DOCUMENTS

| | | |
|---|---|---|
| 6,075,783 A | 6/2000 | Voit |
| 6,079,036 A | 6/2000 | Moharram |
| 6,111,893 A | 8/2000 | Volftsun et al. |
| 6,118,779 A | 9/2000 | Madonna |
| 6,118,780 A | 9/2000 | Dunn et al. |
| 6,119,160 A | 9/2000 | Zhang et al. |
| 6,122,263 A | 9/2000 | Dahlin et al. |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,154,467 A | 11/2000 | Hager et al. |
| 6,178,181 B1 | 1/2001 | Glitho |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,307,926 B1 * | 10/2001 | Barton et al. ............... 379/189 |
| 6,324,183 B1 * | 11/2001 | Miller et al. ................ 370/467 |
| 6,411,632 B2 | 6/2002 | Lindgren et al. |
| 6,529,524 B1 * | 3/2003 | Liao et al. .................. 370/467 |
| 6,553,427 B1 | 4/2003 | Chang et al. |
| 6,584,190 B1 | 6/2003 | Bressler |
| 6,594,258 B1 | 7/2003 | Larson et al. |
| 6,611,533 B1 | 8/2003 | Liao et al. |
| 6,674,748 B1 | 1/2004 | Dykhuizen et al. |
| 6,678,242 B1 | 1/2004 | Simon |
| 6,683,881 B1 * | 1/2004 | Mijares et al. ............. 370/401 |

FOREIGN PATENT DOCUMENTS

| | | |
|---|---|---|
| WO | WO97/11563 | 3/1997 |
| WO | WO00/22840 | 4/2000 |
| WO | WO00/30369 | 5/2000 |
| WO | WO00/31933 | 6/2000 |
| WO | WO00/33519 | 6/2000 |
| WO | WO00/56032 | 9/2000 |

OTHER PUBLICATIONS

Official Action of the European Patent Office for EP Application No. 00919979.5-2413 (Dec. 16, 2004).
Official Action of the European Patent Office for EP Application No. 00919614.8-2413 (Nov. 10, 2004).
Pai, "In-Building Wireless: The Next Generation," TelephonyOnline.com, pp. 1-4 (Jun. 30, 2004).
Handa, "In Building Wireless: The Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP Planet, pp. 1-4 (May 14, 2002).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
Swartz, "Ready, Set, Wireless Office!," Wireless Review, pp. 1-4 (Jun. 1, 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Business and Marketing," Cambridge Telcom Report, pp. 1-4 (Apr. 24, 2000).
"Market and Development Agreement Targets Customers Looking for Ways to Become More Productive Through Convenient and Cost-Effective Communication," Ericsson Press Release, pp. 1-2 (Apr. 4, 2000).
Sulkin, "Emerging Options for Wireless PBXs," Voice2000, pp. 1-8 (Feb. 2000).
Drzewianowksi, "WLANs—For the Picking," Communications Solutions™ Next-Gen Networks, pp. 1-9 (Jan. 2000).
"The Wireless Business Connection," Second Quarter 2000 Report, The Phillips Group—Infotech, pp. 1-9 (2000).
"Ericsson Announces General Availability of Its Mobile Advantage Wireless Office System," Ericsson Press Release, pp. 1-2 (Nov. 4, 1999).
"Corporate Offices to Go Wireless First Australian GSM on the Net Trial," Ericsson Press Release, pp. 1-3 (Aug. 11, 1999).
"Ericsson Solution Chosen for World's First Combined DECT/GSM Communications Service," Ericsson, pp. 1-9 (Jun. 21, 1999).
Johanson et al., "Mobile Advantage Wireless Office—A Digital Wireless Office System for TDMA/136 Networks," Ericsson Review No. 1, pp. 20-27 (1999).
"Enterprise IP Gateway," Ericsson, pp. 1-6 (1999).
"The Ericsson IPT System," Ericsson, pp. 1-8 (1999).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
"Ericsson Wireless Office Services to Provide Digital System Through AT&T Wireless Services," Ericsson Press Release, pp. 1-2 (Apr. 17, 1998).
Woods, "Fresno Bee Still Buzzing About Wireless," TechNews, pp. 1-2 (1995).
"teleSys Announces the Compatibility of Ericsson's Mobile Advantage Wireless Office and teleSys' MACH7-IP Gateway," teleSys Software—Press Release, pp. 1-2 (Publication Date Unknown).

* cited by examiner

DAC PROCESS DATABASE — 526

KEY

| PC | SSN |
|---|---|
| 2-1-1 | 50 |
| 2-1-1 | 50 |
| 2-1-1 | 20 |
| 2-1-1 | 30 |

DATA FIELDS

| Host | Port | Protocol | TT | Status | Congestion | Owner |
|---|---|---|---|---|---|---|
| 10.20.30.40 | 5230 | SQL | CNAM | Avail. | 25% | BellAtlantic |
| 10.21.30.41 | 5340 | ODBC | CNAM | OOS | 0% | Illuminet |
| 11.22.30.42 | 5450 | SQL | 800 | Avail. | 78% | BellAtlantic |
| 12.23.30.43 | 5780 | TCAP | CNAM | Avail. | 47% | Illuminet |

Figure 4

METHODS AND SYSTEMS FOR PROVIDING DATABASE NODE ACCESS CONTROL FUNCTIONALITY IN A COMMUNICATIONS NETWORK ROUTING NODE

PRIORITY APPLICATION INFORMATION

This application is a continuation-in-part of U.S. patent application Ser. No. 09/205,809, filed Dec. 4, 1998 (U.S. Pat. No. 6,324,183), a continuation-in-part of U.S. patent application Ser. No. 09/443,712, filed Nov. 19, 1999 (pending), and claims the benefit of U.S. Provisional Patent Application Ser. No. 60/127,889, filed Apr. 5, 1999, the disclosures of each of which are incorporated herein by reference in their entirety.

TECHNICAL FIELD

The present invention relates to the routing of signaling messages in a communications network, and more particularly to methods and systems for routing signaling messages destined for database network elements.

BACKGROUND ART

In modern telephony networks, service control points (SCPs) serve as an interface to telephony related databases, such as: call management services databases (CMSDB); line information databases (LIDB); and business services databases (BSDB). These databases are used, at least in part, to facilitate a variety of advanced intelligent network (AIN) related services including: find me service; follow me service; computer security service; call pickup service; store locator service; call waiting service; call block service; calling name delivery service; three way calling service; and 800 number services.

With particular regard to find me service, this service allows calls to be forwarded to another location. The difference between this feature and current call forwarding functionality is the ability to screen unwanted calls from forwarding. Only authorized callers are forwarded to the new location. Similarly, follow me service allows a number to be forwarded on a time schedule. The subscriber determines the time forwarding is to take place when the feature is invoked. Destinations can include both wired and wireless telephones or handsets.

Computer security service allows subscribers to prevent unauthorized callers from accessing a computer or application services. Only callers with the authorized access code or calling from an authorized number can access the services. The SS7 network delivers the calling party number to the destination end office. This number is then checked in a database located with a service control point (SCP), and, if authorized, is allowed to connect with the application. With call pickup service, when a call is placed to a number and is unanswered, the called party can be paged via radio pager. The called party can then dial a code from any telephone at any location and immediately be connected with the waiting caller. With regard to paging type services, manufacturers of such personal communications services (PCS) devices have to date developed two-way pagers that connect a caller with the party being paged. The pager is a two-way transceiver capable of receiving calls (pages) and connecting the caller with the paged party.

Store locator service allows businesses to advertise one number, and have callers automatically transferred to the nearest location based on the caller's telephone number. This allows businesses to advertise nationwide for all locations without special ads that are region specific. The calling party number is matched in a routing database located at an SCP, and the SCP provides the end office with the routing instructions based on the calling party number. With call routing service, businesses can reroute calls during periods of excessively high call volumes or after business hours.

It will be further appreciated that such telephony service databases may also be employed to provide communication service subscribers the flexibility to easily port their service from one communication service provider to another (i.e., number portability or local number portability). The application of such SCP-type database services is not limited to the traditional wired public switched telephone network (PSTN), but is also widely implemented in the wireless telecommunications industry. Typical wireless network communication database applications include: home location registers (HLRs), visitor location registers (VLRs), authentication centers (AuCs), and equipment identification registers (EIRs). In general, SCPs are the network elements that include database systems for providing the services discussed above.

It will also be appreciated that with the continuing convergence of traditional data networks and traditional telecommunication networks, the number and variety of converged or inter-network service related database applications designed to service the needs of combined data-telecommunications subscribers (e.g., presence service databases) will increase dramatically in the future.

With particular regard to traditional SCP network database elements, those skilled in the art of telecommunication network services will appreciate that an SCP is typically comprised of both a front end computer processor system and a back end database system. That is, the SCP front end processor (FEP) system typically does not store or contain the bulk data or information, but instead is the interface to a mainframe or minicomputer system that holds the actual database. Typically, there is a one-to-one correspondence between each FEP and an associated back end computing platform. In a signaling system 7 (SS7) signaling network environment, communication between an SCP front end and other nodes in the SS7 network is accomplished via dedicated SS7 communication links, while communication between the SCP front end and mainframe database back end is typically effected via a TCP/IP connection (or X.25 in older legacy systems). However, it should be noted that even within the telecommunications industry it is not uncommon to hear the term SCP used to describe the combination of front-end processors and mainframe back end database system.

From an accessibility standpoint, the SS7 network address component of an SCP front end is a point code (PC), while the address component of an application residing on the database back end is referred to as a subsystem number (SSN). A single SCP may contain multiple applications and databases, and as such, there may be multiple subsystem numbers associated with a single SCP point code. Consequently, each SCP must be assigned a unique SS7 network address PC, but may have multiple back end database subsystems provisioned under each unique SS7 network address PC.

Typically, the front end of an SCP located in an SS7 network can perform protocol conversion from SS7 to TCP/IP (or SS7 to X.25 in the case of legacy systems), or it may provide the capability of communicating with the associated back end database directly through the use of primitives. A primitive is an interface that provides access from one level of the protocol to another level. In the case of back end databases, each database is considered to be an application entity, and the protocol used to access and interface to each application entity is known as transaction capabilities application part or TCAP.

Shown in FIG. 1 is an example of a prior art telecommunications network, generally indicated by the numeral 100, that provides AIN-type functionality similar to that described above. Telecommunications network 100 includes an originating end office (EO) or service switching point (SSP) 110, a signal transfer point (STP) 112, a first SCP 116, a second SCP 120, and a third SCP 124. It will be appreciated from FIG. 1 that SSP 110 has a network address PC of 3-1-1, STP 112 has a PC of 2-1-1, SCP 116 has a PC of 1-1-1 and a SSN of 20, SCP 120 has a PC of 1-1-2 and a SSN of 20, and SCP 124 has a PC of 1-1-3 and SSN of 20. As further indicated in FIG. 1, SSP 110 is coupled to STP 112 via a dedicated SS7 communication link 114, which is in turn communicatively coupled to each of the three SCP nodes via dedicated SS7 communication links 118, 122, and 126. With regard to the SCP nodes 116, 120, and 124, it will be appreciated from FIG. 1 that each overall SCP node is comprised of a number of components or sub-systems. More particularly, SCP 116 generally includes a front end processor (FEP) 128, which is coupled to a back end database (BED) 130 via a communication link or bus 132.

Given the above description of network 100, it will be appreciated by one skilled in the art of telecommunication signaling operations that if, for instance, Calling Name (CNAM) service is requested by a subscriber that is serviced by SSP 110, then SSP 110 will be required to formulate and send a CNAM query-type SS7 signaling message to STP 112 via the dedicated SS7 communication link 114. If it is also assumed that a database application corresponding to SSN 20 of SCP 116 is provisioned to provide CNAM-type information, then CNAM query message will either be addressed directly to the PC & SSN of SCP 116 (i.e., PC: 1-1-1, SSN: 20), or the CNAM query message will be addressed so as to request a final destination address translation at the STP 112 (i.e., through global title translation). For purposes of illustration, it is assumed that global title translation service is not required and, consequently, that the CNAM query message is addressed directly to SCP 116 (i.e., PC: 1-1-1, SSN: 20). As such, the CNAM query message is received by STP 112 and subsequently routed over communication link 118 to FEP 128. FEP 128 in turn receives the CNAM query message, processes the message, and facilitates access to the CNAM data stored in the BED 130. Ultimately, a CNAM reply message addressed to SSP 110 (PC: 3-1-1) is formulated and transmitted back to STP 112, which in turn routes the message to SSP 110.

As described above, each complete SCP unit is equipped with a front end processor that is responsible for managing the unit's associated database resources. Such management functions include: protocol conversion, message parsing, administration of inbound queries and outbound responses, load sharing, etc. Each front end processor is integral with the SCP unit and consequently, there is a one-to-one relationship that exists between front end processors and SCP units. Front end processors are expensive, and what is needed is a way to reduce the overall cost of SCP units by allowing one front end processor to drive multiple SCP units.

Therefore, what is needed is a system and method of incorporating SCP front end processing functionality within a communications network routing node such that multiple SCP back ends can be serviced by the single routing node.

Furthermore, the SS7 signaling links typically employed to connect to SCP units are capital intensive and expensive to maintain. Consequently, a method of connecting to SCP units that does not require dedicated, expensive SS7 signaling links is also needed.

DISCLOSURE OF THE INVENTION

According to one aspect, the present invention includes a communications network element that is capable of generally routing messages and also performing load sharing, protocol conversion, and other services that have traditionally been provided by SCP front end processing (FEP) modules. The FEP routing node includes a communication module or modules capable of transmitting and receiving data packets over both SS7 and IP networks. A message discrimination process examines incoming data packets and subsequently directs certain packets to a database access control process that administers database lookup, protocol translation, and other FEP related processing services.

The functions for providing database access control are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing database access control are described below as being associated with cards or subsystems within a routing node. It is understood that these cards or subsystems include hardware for storing and executing the processes and modules. For example, each card or subsystems described below may include one or more microprocessors, such as a Pentium® processor available from Intel Corporation, and associated memory.

Accordingly, it is an object of the present invention to provide a routing node that offers centralized front end processing functionality to multiple SCP back ends.

It is yet another object of the present invention to provide a routing node that facilitates load sharing functionality among multiple SCP back ends.

It is yet another object of the present invention to provide a routing node that facilitates message protocol translation.

It is yet another object of the present invention to provide a method of eliminating the need for SS7 network point codes associated with SCP nodes.

It is yet another object of the present invention to provide a method of creating a virtual SCP that is comprised of multiple SCP back end databases, where the virtual SCP is assigned a single SS7 network point code.

It is yet another object of the present invention to provide a method of mapping multiple SCP nodes to a single SS7 network point code.

It is yet another object of the present invention to provide a method of allowing all messages requiring SCP service to be addressed to an SS7 point code that is the same as the SS7 point code of a router of the present invention.

It is yet another object of the present invention to provide a method of allowing messages to be routed based on the ownership of a database or SCP node.

Some of the objects of the invention having been stated hereinabove, other objects will become evident as the description proceeds, when taken in connection with the accompanying drawings as best described hereinbelow.

BRIEF DESCRIPTION OF THE DRAWINGS

Embodiments of the invention will now be described with reference to the accompanying drawings, of which:

FIG. 4 is a table that illustrates a sample database access control (DAC) database structure and data used in a preferred embodiment of a packet routing node of the present invention;

DETAILED DESCRIPTION OF THE INVENTION

Figure 2:
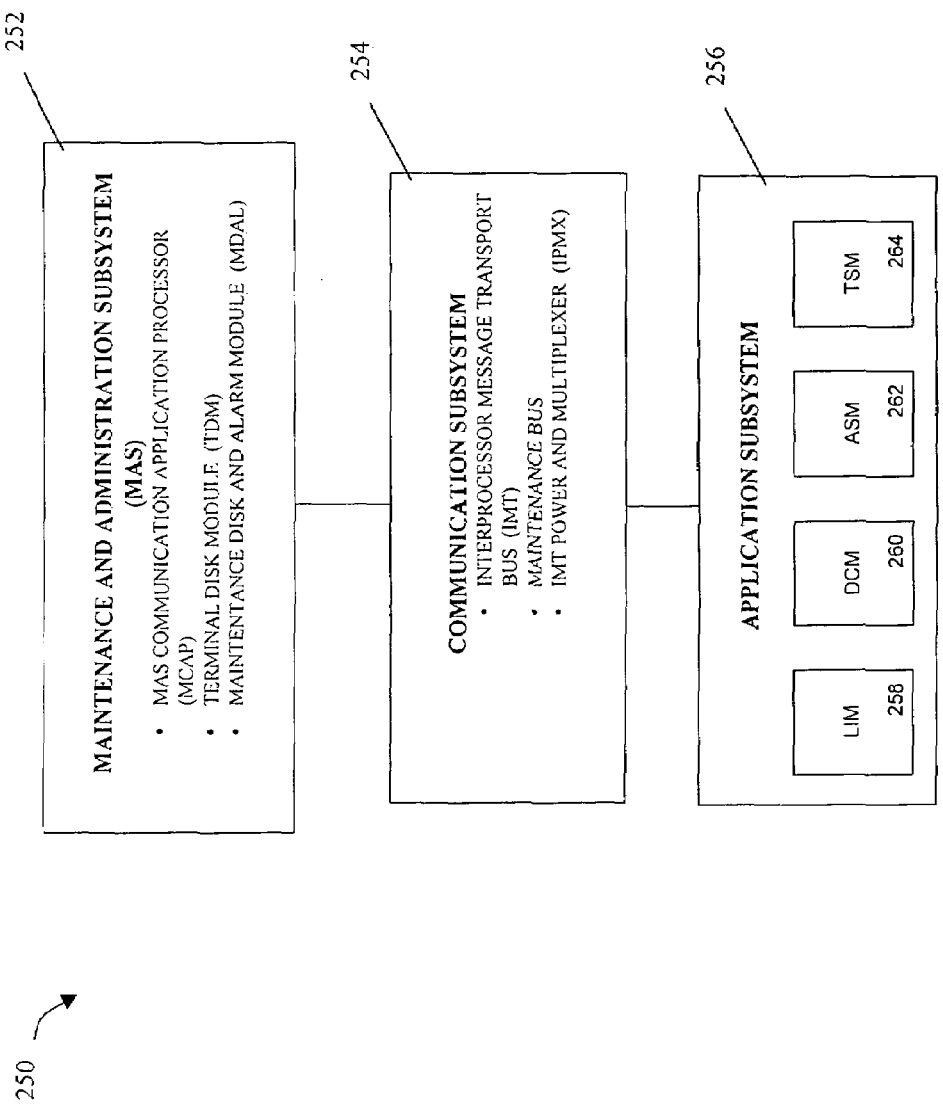
FIG. 2 is a schematic diagram of an STP switching node.

Disclosed herein are several embodiments of the present invention, all of which include a network element that performs functions similar to that of a traditional telecommunications network packet routing switch, such as a signal transfer point (STP). Each of the embodiments described and discussed below, employs an internal architecture similar to that of high performance STP and signaling gateway (SG) products which are marketed by Tekelec, Inc. of Calabasas, Calif. as the Eagle® STP and IP⁷ Secure Gateway™, respectively. A block diagram that generally illustrates the base internal architecture of the IP⁷ Secure Gateway™ product is shown in FIG. 2. A detailed description of the Eagle® STP may be found in the *Eagle® Feature Guide* PN/910-1225-01, Rev. B, January 1998, published by Tekelec, the disclosure of which is incorporated herein by reference in its entirety. Similarly, a detailed description of the IP⁷ Secure Gateway™ may be found in Tekelec publication PN/909-0767-01, Rev B, August 1999, titled *Feature Notice IP⁷ Secure Gateway™ Release* 1.0, the disclosure of which is incorporated by reference in its entirety. The specific functional components of an IP⁷ Secure Gateway™ for transmitting and receiving TCAP messages over an Internet protocol (IP) network are described in above-referenced, co-pending U.S. patent application Ser. No. 09/205,809. As described in the above referenced *Eagle® Feature Guide*, an Eagle® STP 250 includes the following subsystems: a maintenance and administration subsystem (MAS) 252, a communication subsystem 254 and an application subsystem 256. The MAS 252 provides maintenance communications, program load, user interface, alarm processing and system disks. The communication subsystem 254 includes an interprocessor message transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including but not limited to: al link interface module (LIM) 258 that provides SS7 links and X.25 links, a database communication module (DCM) 260 that provides an IP interface using transmission control protocol (TCP), and an application service module (ASM) 262 that provides global title translation, gateway screening and other services. A translation service module (TSM) 264 may also be provided to support triggered local number portability service. Once again, a detailed description of the Eagle® STP is provided in the above-cited *Eagles Feature Guide* and need not be described in detail herein. It should also be appreciated that, in addition to conventional SS7 LIM cards, a database communication module (DCM) can be employed in a similar manner to provide for the transport of IP encapsulated SS7 messages over an IP network, as described in the above referenced *Feature Notice IP⁷ Secure Gateway™ Release* 1.0 publication. With particular regard to the TSM triggered LNP services module mentioned above, a detailed description of the Tekelec triggered LNP solution may be found in the *Feature Guide LNP LSMS PN*/910-1598-01, Rev. A, January 1998, published by Tekelec, the disclosure of which is incorporated herein by reference in its entirety. Furthermore, systems and methods for providing triggerless LNP functionality within a network routing node are described in commonly-assigned, co-pending U.S. patent application Ser. No. 09/503, 541, the disclosure of which is incorporated herein by reference in its entirety.

Integrated DAC Database Embodiment

Figure 3:
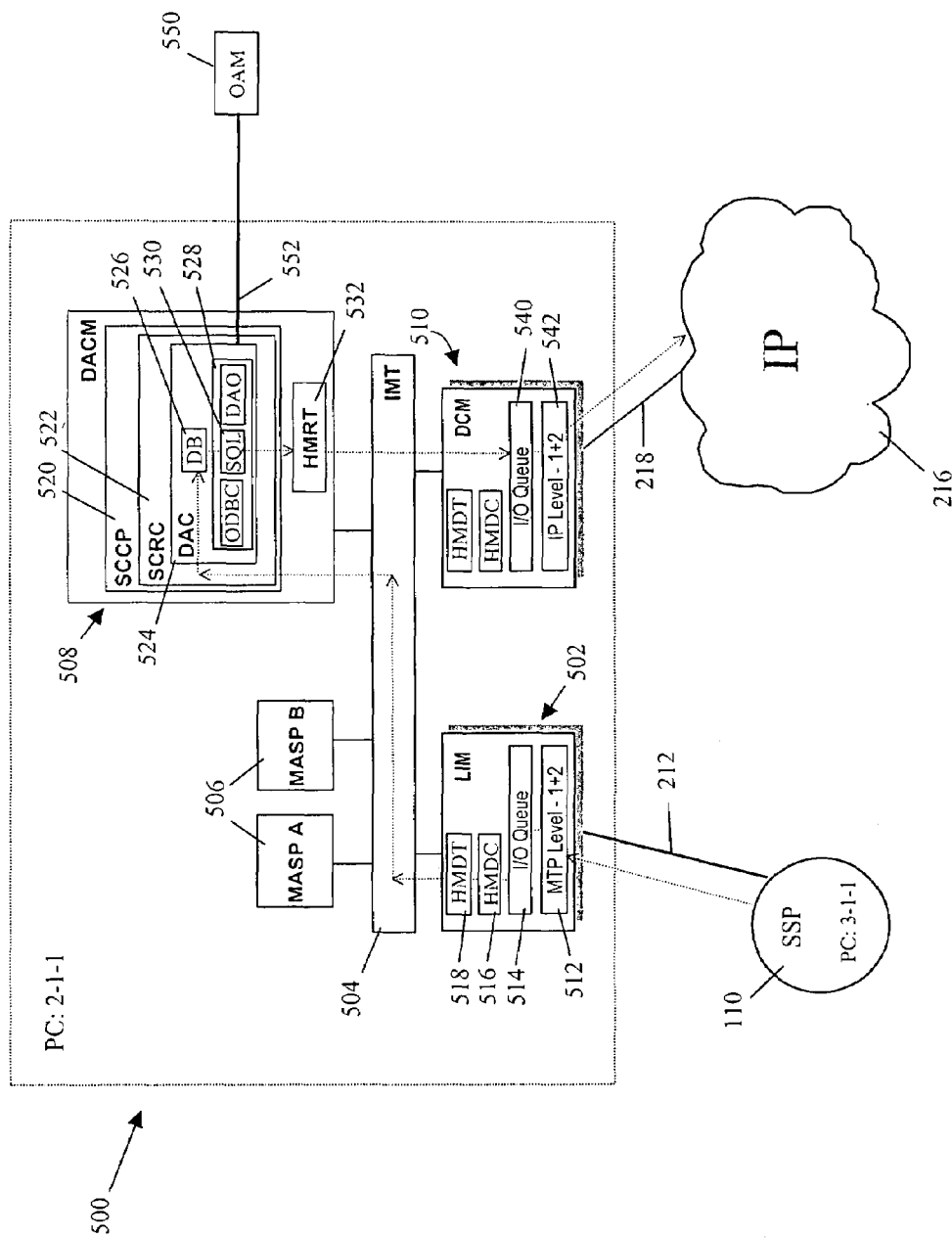
FIG. 3 is a schematic and message flow diagram of a system architecture according to a preferred embodiment of a packet routing node of the present invention, generally indicating message flow associated with an incoming SCP query packet.

Shown in FIG. 3 is a front end processing (FEP) packet routing node of the present invention that is generally indicated by the numeral 500. It will be appreciated that FEP routing node 500 is communicatively coupled to an EO or SSP 110 via an SS7 signaling link 212, and to an IP data network 216 via an IP connection 218. As further illustrated in FIG. 3, FEP packet routing node 500 includes a high speed interprocessor message transport (IMT) communications bus 504. Communicatively coupled to IMT bus 504 are a number of distributed processing modules or cards including: a pair of maintenance and administration subsystem processors (MASPs) 506; an SS7 capable link interface module (LIM) 502; an IP capable database communication module (DCM) 510; and a database access control module (DACM) 508. These modules are physically connected to the IMT bus 504 such that signaling and other type messages may be routed internally between all active cards or modules. For simplicity of illustration, only a single LIM 502, DCM 510 and DACM 508 are included in FIG. 3. However, it should be appreciated that the distributed, multi-processor architecture of the FEP routing node 500 facilitates the deployment of multiple LIM, DCM, DACM and other cards, all of which could be simultaneously connected to and communicating via IMT bus 504.

MASP pair 506 implement the maintenance and administration subsystem functions described above. As the MASP pair 506 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 502 is comprised of a number of sub-component processes including, but not limited to, SS7 MTP level 1 and 2 processes 512, an I/O buffer or queue 514, an SS7 MTP level 3 HMDC process 516, and an HMDT process 518. MTP level 1 and 2 processes 512 provide the facilities necessary to send and receive digital data over a particular physical media/physical interface, as well as to provide error detection/correction and sequenced delivery of all SS7 message packets. I/O queue 514 provides for temporary buffering of incoming and outgoing signaling message packets. MTP level 3 HMDC process 516 receives signaling messages from the lower processing layers and performs a discrimination function, effectively determining whether an incoming SS7 message packet requires internal processing or is simply to be through switched. HMDT process 518 handles internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

DCM 510, shown in FIG. 3, generally includes an I/O buffer or queue 540 and an IP level 1 & 2 process 542. It will be appreciated that outgoing message packets routed through the DCM 510 will be transmitted out of the FEP routing node 500 and into IP network 216 via IP communication link 218. As the SS7 and IP communication protocols are not inherently compatible, all SS7 message packets that are to be sent into the IP network 216 are first encapsulated within a TCP/IP routing envelope prior to transmission. This IP encapsulation is performed on the DCM 510 by the IP level 1 & 2 process 542. Preferred packet formats for encapsulating various types of SS7 messages in IP packets are described in Internet Engineering Task Force (IETF) INTERNET DRAFT entitled "Transport Adapter Layer Interface", May 28, 1999, the disclosure of which is incorporated herein by reference in its entirety. Furthermore, a Tekelec Transport Adapter Layer Interface (TALI™) is described in commonly-assigned, co-pending U.S. Provisional Patent Application Ser. No. 60/137,988, the disclosure of which is incorporated herein by reference in its entirety.

Once again, the description of LIM and DCM sub-components provided above is limited to those sub-components that are relevant to the sample implementation scenarios illustrated herein. For a comprehensive discussion of additional LIM and DCM operations and functionality, the above-referenced Tekelec publications can be consulted.

With regard to DACM card 508, it will be appreciated from FIG. 3 that DACM generally includes the database and control processes necessary to achieve the front end processing (FEP) functionality of the present invention. The DACM 508 shown in FIG. 3 is comprised, in part, of a signaling connection control part (SCCP) subsystem 520, an SCCP controller, known as a signaling connection routing controller (SCRC) process 522, and a database access control (DAC) process 524. SCCP subsystem 520 is responsible for receiving and preliminary processing of incoming SCCP protocol message packets. The SCRC process 522 is responsible for discrimination of signaling messages at the SCCP level, and for distributing the signaling messages to a higher processing level when appropriate. In the configuration shown in FIG. 3, the next highest processing level is represented by the DAC process 524.

DAC process 524 includes a DAC database 526 and a DAC protocol translation process 528, as indicated in FIG. 3. DAC process 524 is generally responsible for examining properties or characteristics of an incoming message and determining what, if any, processing is required. Such incoming message properties or characteristics might include, but are not limited to: the origination point code (OPC); destination point code (DPC); subsystem (SSN); and translation type (TT). DAC process 524 is also responsible for monitoring and storing information related to the operating status of network database or SCP nodes which have been provisioned for FEP servicing by the FEP routing node 500. Such operating status information is also stored in DAC database 526 and might include, but is not limited to: node In Service/node Out Of Service indicators; overall node congestion indicators; and link specific congestion indicators. In addition to operating status type information, DAC database 526 can also contain information related to database or SCP node ownership. Consequently, message routing decisions can be based, at least in part, upon database or SCP node ownership. Along with such operating status and ownership information, the DAC database 526 maintains a set of SS7 to IP routing address translation instructions, all of which are generally illustrated in FIG. 4. It will be further appreciated that DAC protocol translation process 528 is provisioned to translate an incoming database query or response message into any of a variety of provisioned database protocols (e.g., structured query language (SQL), open database connectivity (ODBC), etc.) depending upon the protocol dictated by a particular SCP or database node. Once DAC processing is complete, the resulting message is passed to an HMRT process 532 for internal routing to the appropriate outbound LIM or DCM module.

It will be appreciated from FIG. 3 that DACM 508 is in communication with and serviced by an Operations Administration and Maintenance (OAM) system 550. In general, an OAM system provides a mechanism whereby network routing address information contained within the DAC process 524 can be externally provisioned or dynamically updated. As the interaction between FEP routing node 500 and OAM 550 is not particularly relevant to the present invention, a detailed discussion of such OAM system functionality will not be presented herein. It should suffice to state that the OAM 550 maintains the routing database component of the DAC process 524 with the most current network routing address information available at any given time.

In the embodiment shown in FIG. 3, the DAC process 524 resides in one or more blocks of high speed random access memory (RAM) that are located on DACM card 508. However, it will be appreciated by those skilled in the art of high-performance computing systems that such a software process and any databases associated therewith could be configured such that some or all of the information is stored on a high density, fast access physical storage media such as magnetic or optical discs.

As indicated in FIG. 4, the DAC database component 526 is comprised of a series of entries or records, with each record containing a number of data fields including, but not limited to: a point code (PC) field; a subsystem (SSN) field; an IP host name field; an IP port field; a database or SCP node protocol field; a service or translation type (TT) field; a node status field; a node congestion field; and an owner field.

Once again, DACM 508 also contains HMRT process 532 that is responsible for the routing of message packets once DAC processing has been completed. That is, the HMRT process 532 determines to which DCM or LIM card a message packet should be internally routed for subsequent outbound transmission into the communication network.

Figure 5:
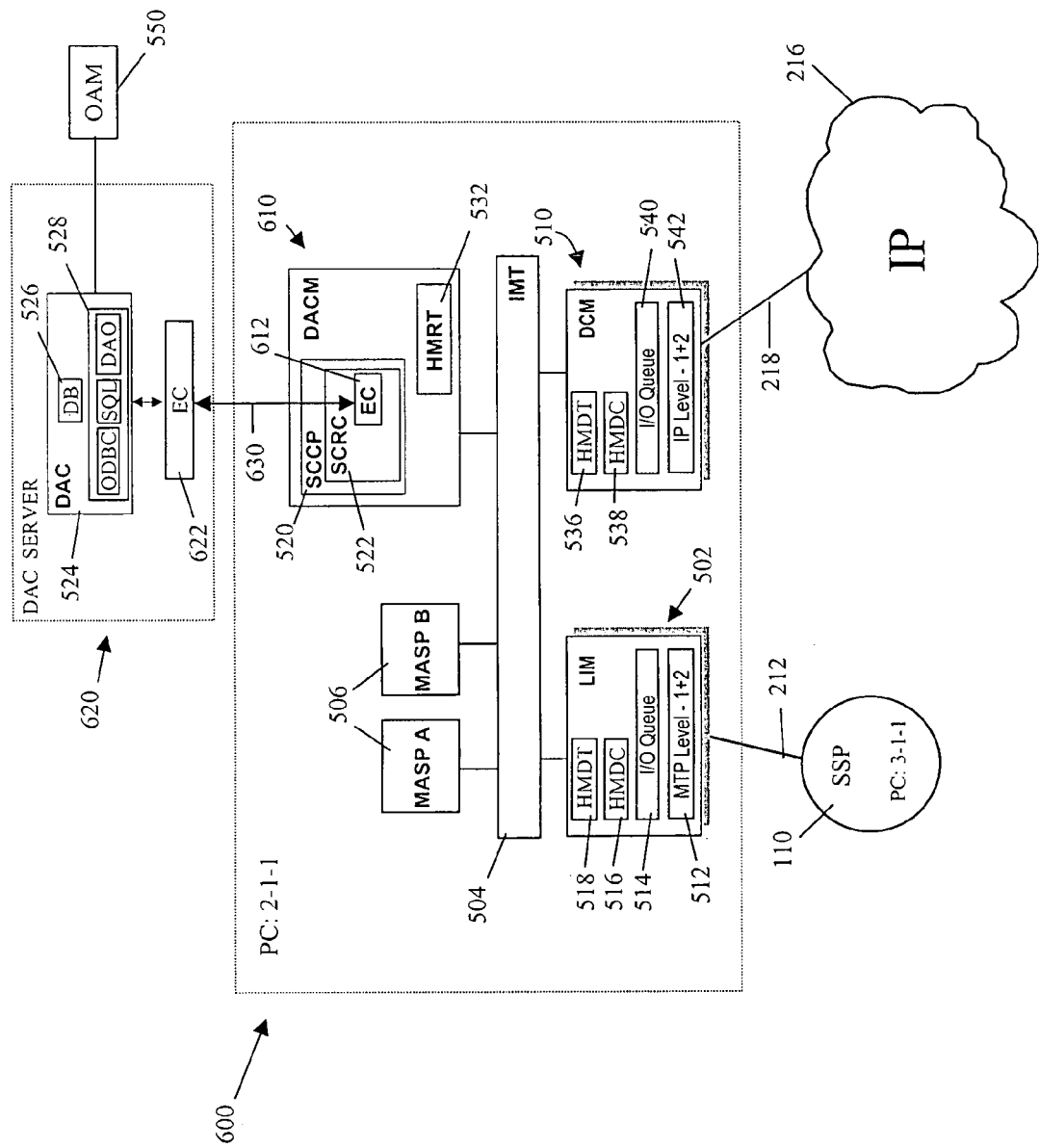
FIG. 5 is a schematic diagram of a system architecture according to another embodiment of a packet routing node of the present invention, generally illustrating an externally mounted DAC process.

Shown in FIG. 5 is another embodiment of the FEP routing node of the present invention, generally indicated by the numeral 600. FEP routing node 600 is identical in overall function to the FEP routing node embodiment illustrated in FIG. 3 and described above. In most respects, the form of FEP routing node 600 is identical to the FEP routing node 500 shown in FIG. 3. That is, FEP packet router node 600 generally includes a high speed interprocessor message transport (IMT) communications bus 504, and a number of distributed processing modules or cards including; a pair of maintenance and administration subsystem processors (MASPs) 506, an SS7 capable link interface module (LIM) 502, an IP capable database communication module (DCM) 510. Once again, it will be appreciated that these modules are physically connected to IMT bus 504 such that signaling and other type messages may be routed internally between all active cards or modules and that, for simplicity of illustration, only a single LIM 502 and DCM 510 are depicted. However, as with node 500, it should be appreciated that the distributed, multi-processor architecture of FEP routing node 600 also facilitates the deployment of multiple LIM, DCM and other cards, all of which could be simultaneously connected to and communicating via IMT bus 504.

In the case of FEP routing node 600, it will be appreciated from FIG. 5 that the functionality of DACM card 508, as described above, is now provided by a DACM card 610 in combination with an external database access control (DAC) server 620. Once again, it will be appreciated the combination of DACM card 610 and DAC server 620 includes the database and control processes necessary to achieve the front end processing (FEP) functionality of the present invention. The DACM card 610 shown in FIG. 5 includes a signaling connection control part (SCCP) subsystem 520, a description of which was provided above. Also, as with the previously discussed embodiment, DACM card 610 includes an SCCP controller known as a signaling connection routing controller (SCRC) process 522. However, unlike the previous embodiment described above, DACM 610 employs a high-speed Ethernet controller (EC) process 612. Once again, as described above, the SCCP subsystem 520 is responsible for receiving and preliminary processing of incoming SCCP protocol message packets, while the SCRC process 522 is responsible for discrimination and subsequent distribution of signaling messages at the SCCP level. In the case of DACM card 610, messages that satisfy the SCRC discrimination criteria are distributed or directed to the high-speed Ethernet controller process 612. EC process 612 is in turn responsible for controlling the process of communicating messages, via an Ethernet connection 630, to and from the associated DAC server 620. More particularly, DAC server 618 includes a corresponding high-speed Ethernet controller process 622 that serves as the communications interface between DACM card 610 and an on-board DAC process 524. Once again, it will be appreciated that DAC process 524 generally includes a DAC database process 526 and a DAC protocol translation process 528, and is responsible for determining whether front end processing service is to be provided by the FEP routing node. DAC process 524 is also responsible for monitoring and storing information related to the operating status of provisioned network database or SCP nodes. As discussed previously, in addition to operating status type information, DAC process also contains information related to database or SCP node ownership. Consequently, message routing decisions can be based, at least in part, upon database or SCP node ownership. Along with such operating status and ownership information, the DAC database process 526 maintains a set of routing address translation instructions, which are generally illustrated in FIG. 4. It will be further appreciated that DAC protocol translation process 528 is provisioned to translate incoming database query and response messages into any of a variety of database query protocols (e.g., SQL, ODBC, etc.) depending upon the database protocol dictated by a particular destination SCP or database node. Once DAC processing is complete, the resulting message is passed to an HMRT process 532 for internal routing to the appropriate outbound LIM or DCM module.

Once again, it will be appreciated from FIG. 5 that DAC server 620 is in communication with and serviced by an operations administration and maintenance (OAM) system 528, in much the same manner as that described above for DACM 508 in FIG. 3.

In the embodiment shown in FIG. 5, the DAC process 524 resides in one or more blocks of high speed random access memory (RAM) that are located within the DAC server 620. However, it will be appreciated by those skilled in the art of high-performance computing systems that such a software process and any databases associated therewith could be configured such that some or all of the information is stored on a high density, fast access physical storage media such as magnetic or optical discs.

Once again, as indicated in FIG. 4, the DAC database component 526 of DAC server 620 is comprised of a series of entries or records, with each record containing a number of data fields including, but not limited to: a point code (PC) field, a subsystem (SSN) field, an IP host name field, an IP port field, a database or SCP node protocol field, a service or translation type (TT) field, a node status field, a node congestion field, and an owner field.

DAC Query Transaction Processing

Figure 6:
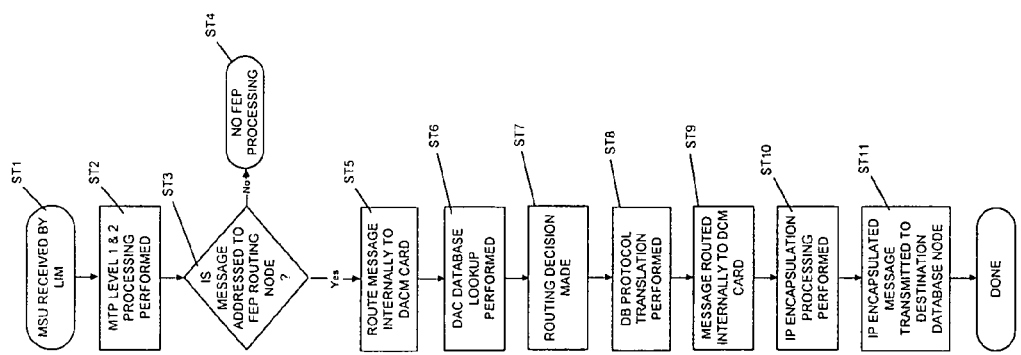
FIG. 6 is a flow chart diagram illustrating integrated front end processor (FEP) processing of a SCP query message according to an embodiment of a packet routing node of the present invention.

For purposes of illustration, the path of a typical SS7 TCAP query message requiring FEP routing node service is traced, in FIG. 3, from reception at the FEP routing node 500 by the inbound LIM 502, through processing by DACM card 508, and on to the outbound DCM 510. A detailed flow chart of FEP related query message processing steps is presented in FIG. 6, and may be used in conjunction with the schematic diagram shown in FIG. 3 to better understand FEP servicing methodology.

Beginning with step ST1, an incoming TCAP query message is received at the inbound LIM module 502. In step ST2, the incoming TCAP query message is received and processed by the MTP Level 1 and 2 process 512. With MTP Level 1 and 2 processing complete, the signaling message packet is temporarily buffered in the I/O queue 514 before being passed up the stack to the MTP Level 3 HMDC process 516, where SCCP type discrimination processing is performed. In the example shown in FIG. 2, HMDC process 516 examines the message packet and determines that the DPC of the packet is the PC (2-1-1) of the FEP routing node 500 (ST3). Consequently, further processing of the SCCP MSU within the FEP routing node is assumed to be necessary, and the packet is passed to the HMDT process 518.

In this particular example, it is assumed that the FEP routing node 500 is provisioned to respond to query messages that are addressed to the true or capability point code of the FEP routing node 500. However, as mentioned previously, FEP routing node 500 could easily be provisioned to provide FEP-type processing in response to many point codes other than that of the FEP routing node. While it may prove to be advantageous for service providers to implement an FEP routing node of the present invention in a communications network in a manner such that all query messages requiring FEP-type processing are addressed to the same PC as that of the FEP routing node, it is not essential to the operation of the present invention.

The HMDT process 518 examines the service indicator (SI) field of the incoming TCAP MSU, which indicates that the message is of an SCCP type. As such, HMDT process 518 places the incoming MSU on high speed IMT bus 504 for transport to DACM 508 and subsequent FEP servicing (ST5).

The internally routed TCAP MSU is received by the DACM resident SCCP process 520, and subsequently examined by SCRC process 522 that is resident on DACM card 508. Upon successful verification, the TCAP MSU is directed to DAC application 524 for further processing. DAC application processing begins with a general determination of incoming message type. Following the determination that the message is a TCAP-type query message, DAC process 524 proceeds with verification of the pointers and field lengths associated with the TCAP message. Given that the message is a TCAP-type query message, a lookup is performed in DAC database 526 based on PC and SSN information contained within the message (ST6). Referring again to FIG. 4, it will be appreciated that in the case of an incoming TCAP query message addressed to PC: 2-1-1 and SSN: 50, the DAC database lookup would return two matching records. DAC process 524 then examines both returned routing translation records and makes a final routing decision based on a pre-defined set of selection rules or conditions.

Once again, as indicated in FIG. 4, it will be appreciated that one of the two returned routing translation records contains a status field value which indicates that the SCP or database node with which it is associated is currently out of service (OOS). Clearly, routing the TCAP query message to an SCP or database node that is OOS would not be desirable. Thus, in this particular example, DAC process 524 opts to route the incoming TCAP query message to the SCP or database node with an IP address of 10.20.30.40: port 5230 (ST7). As such, routing label information within the message packet is modified to reflect this change of destination routing address. In step ST8, using information returned by the DAC database lookup that identifies the protocol employed by the database residing at IP address 10.20.30.40: port 5230, DAC process 524 next directs the TCAP query to the DAC protocol translation process 528. In this case, DAC protocol translation process 528 uses the database query information contained within the TCAP message to construct an equivalent SQL query statement. This new SQL query statement is then substituted for the original database query content of the incoming TCAP message.

With message routing address translation and query protocol translation processing complete, the modified query message is next passed to HMRT process 532 for internal routing to the appropriate DCM card (ST9). Consequently, the modified message packet is internally routed across the IMT bus 504 to DCM 510, where it is generally received by the I/O queue process 540. Eventually, the modified message packet is passed from the I/O queue process 540 on to the IP Level 2 and Level 1 process 542 where properly formatted IP routing label information is applied to the packet prior to transmission into the associated IP network 216 (ST10). Following successful IP Level 1 and 2 processing, the message packet is transmitted into the IP network 216 and generally towards the destination SCP or database node as identified by the previous FEP processing (ST11).

It will also be appreciated that the processing of an incoming TCAP query message is performed in a very similar manner for the embodiment of the FEP routing node 600 shown in FIG. 5. In the case of the configuration contemplated in FIG. 5, messages arriving at the DACM card 610 are simply passed to an external DAC server 620 via a high-speed Ethernet connection 630 prior to DAC database lookup and protocol translation processing. In all other respects, processing of an incoming TCAP query message similar to that described above, would be identical in the FEP routing node 600.

Although the example presented above relates specifically to the reception and subsequent processing of a TCAP query message bound for an SCP or database node, it will be appreciated by those skilled in the art, that the FEP processing node of the present invention can easily be provisioned to intercept and process subsequent response messages generated by such SCP or database nodes. Such response message processing could include database protocol translation, so as to translate the database response statement into a protocol that is usable by the network element that originated or initiated the query transaction.

DAC Network Management Message Processing

As discussed briefly above, one aspect of FEP processing includes routing address translation that is based, at least in part, on the congestion and overall operational status of potential destination SCP or database nodes. Consequently, the FEP routing node, and more specifically DAC process 524, must be capable of acquiring and maintaining accurate information related to the status of the SCP or database nodes that are provisioned to have FEP service provided by the FEP routing node.

Figure 7:
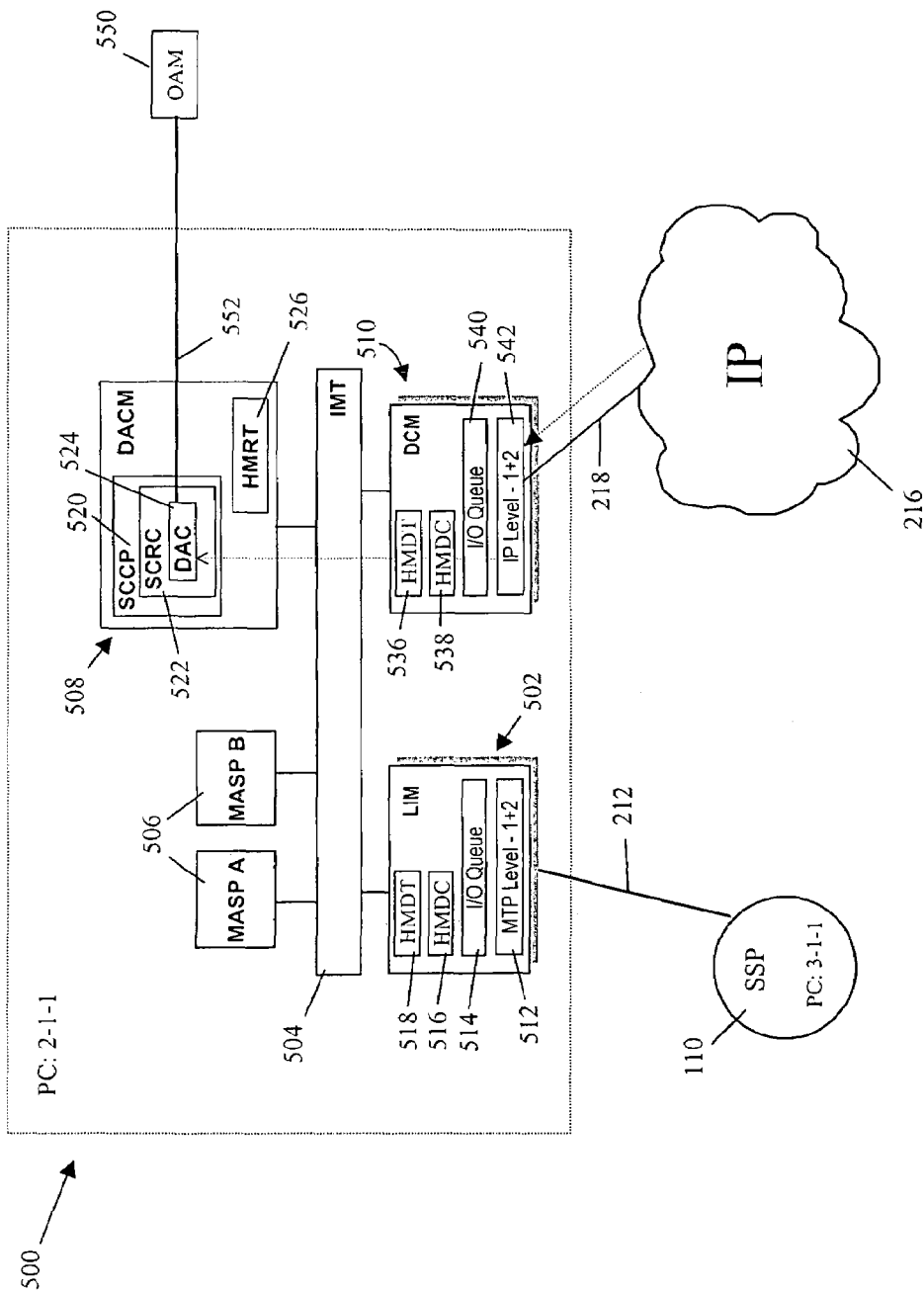
FIG. 7 is a schematic and message flow diagram of a system architecture according to a preferred embodiment of a packet routing node of the present invention, generally indicating message flow associated with an incoming network status packet.

Given such functional requirements, it will be appreciated that FIG. 7 generally illustrates the receipt and subsequent internal processing of a typical network management message received from an SCP or database node residing in or connected to IP network 216. More particularly, FEP routing node 500 is shown receiving a network management message associated with or sent by an SCP or database node that is provisioned to have FEP service provided by the FEP routing node 500. The network management message includes information related to the operational status of the related node or the communication pathway(s) that form the effective communication link between the related node and the FEP routing node 500. Examples of such status information might include, but are limited to; in service/out of service indicators, node congestion indicators, and link congestion indicators.

As indicated in FIG. 7, the network management message is received by DCM card 510 and subsequently TCP encapsulated and processed by the IP Level 1 & 2 process 542. With IP Level 1 and 2 processing complete, the message is passed to and temporarily buffered in I/O queue process 540 before being directed on to HMDC process 538. HMDC process 538 examines the incoming message packet and determines that the message contains information that is required by one or more DACM cards. Consequently, HMDC process 538 passes the message packet to HMDT process 536 for internal routing to the appropriate DACM card(s). In the example implementation shown in FIG. 7, HMDT process 536 internally routes the message packet via IMT bus 504 to the only provisioned DACM card in the system, DACM 508. It will be appreciated that if multiple DACM cards were simultaneously provisioned in the FEP routing node, HMDT process 536 could direct multiple copies of the network management message packet to each of the provisioned DACM cards connected to IMT bus 504.

Once the network management message packet is received by DACM card 508, the message is generally verified and processed by the SCCP and SCRC processes 520 and 522, respectively. The verified and processed network management message is then passed to the DAC process 524. DAC process 524 examines the message packet, extracts the necessary node status information, and updates the appropriate records in the DAC database 526.

Thus, by continuously monitoring and processing network management-type messages generated by the SCP and database nodes provisioned for FEP service by the FEP routing node of the present invention, routing translation data utilized by the FEP routing node to make routing decisions can be maintained in an accurate and useful state.

Once again, it will be appreciated that the FEP routing node configuration shown in FIG. 7 includes all DAC related processing modules onboard the DACM card 508. However, processing of network management messages would be similar in the case of FEP routing node 600, that is generally illustrated in FIG. 5. In the case of the configuration contemplated in FIG. 5, messages arriving at the DACM card 610 are simply passed to an external DAC server 620 via a high-speed Ethernet connection 630 prior to updating of the DAC database 526. In all other respects, processing of an incoming network management message similar to that described above, would be identical in the FEP routing node 500.

FEP Routing Node Network Implementations

Shown in FIGS. 8–11 are several examples of practical network implementations of an FEP routing node of the present invention. It will be appreciated that the particular embodiment of the FEP routing node chosen to illustrate these sample implementations is the same as that shown in FIG. 3 and described in detail above. However, other embodiments of the FEP routing node of the present invention could just as effectively be employed in these sample implementations, including the embodiment illustrated in FIG. 5.

Figure 8:
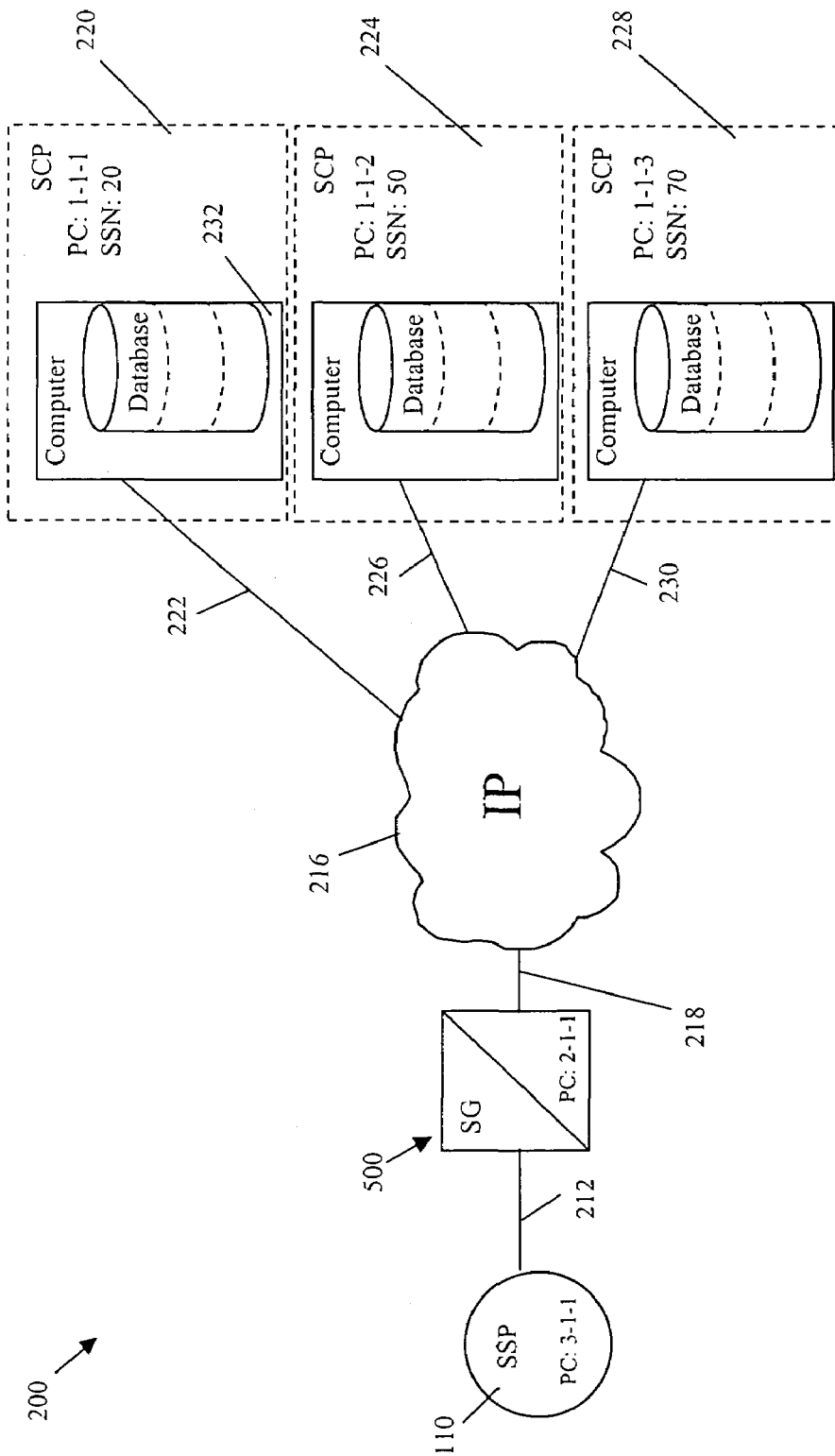
FIG. 8 is a network diagram illustrating an embodiment of the present invention that includes a packet routing node with FEP functionality and multiple SCP nodes.

Shown in FIG. 8 is a typical telecommunications network, generally indicated by the numeral 200. Telecommunications network 200 includes an end office or SSP 110, an FEP routing node 500, an IP data network 216, and three SCP nodes 220, 224, and 228. It will be appreciated that SSP 110 is communicatively coupled to FEP routing node 500 via an SS7 communication link 212. However, as mentioned previously, it is not essential that the link 212 be an SS7-type communication link. Such a link could be an IP link carrying encapsulated SS7 signaling messages. In any event, FEP routing node is in turn communicatively coupled to IP network 216 via an IP link or connection 218. Also connected to IP network 216 via IP connection 222 is SCP 220. In a similar manner, SCP 224 and SCP 228 are connected to IP network 216 via IP connections 226 and 230, respectively.

The network configuration shown in FIG. 8 is one of the simpler implementations of an FEP routing node of the present invention. When compared with the prior art network configuration illustrated in FIG. 1, it will be appreciated that the inclusion of FEP routing node 500 in FIG. 8 allows each of the provisioned SCPs 220, 224, and 228 to eliminate dedicated, internal FEP modules. Consequently, SCP 220 simply includes a computing platform 232 that serves a database back end processor. In a similar manner, SCP 224 and SCP 228 also include back end database computing platforms. Once again, it should be noted that each SCP 220, 224, and 228 is not required to implement a separate FEP module.

In the example shown in FIG. 8, all of the SCP nodes are identified by a unique SS7 point code, each of which is different from the point code assigned to the FEP routing node (2-1-1). More particularly, SCP 220 is assigned a point code of 1-1-1, while SCP 224 has a point code of 1-1-2, and SCP 228 has a point code of 1-1-3. It will also be appreciated that, as each of these SCP nodes is connected to the FEP routing node 500 via the IP data network 216, each SCP also has a uniquely assigned IP address in the form of a host name and port.

As such, when FEP routing node 500 receives a TCAP query message from SSP 110 that is destined for the SCP with point code of 1-1-1 and SSN of 20, FEP routing node might simply perform database protocol translation-type processing on the message, encapsulate the modified message in a properly addressed IP packet, and route the modified message on to SCP 220. Any other processing that was previously performed by FEP 128 shown in FIG. 1 could also be performed by the FEP routing node 500.

One of the great advantages of even such a simple implementation of a FEP routing node of the present invention is apparent upon closer examination of FIG. 8. This advantage being that a single Front End Processing module, properly integrated within a routing node of the present invention, can accommodate all of the FEP tasks associated with each of the SCPs 220, 224, and 228. Such an architecture presents SCP node owners with a major cost savings, which can ultimately be passed on to the end consumer.

Figure 9:
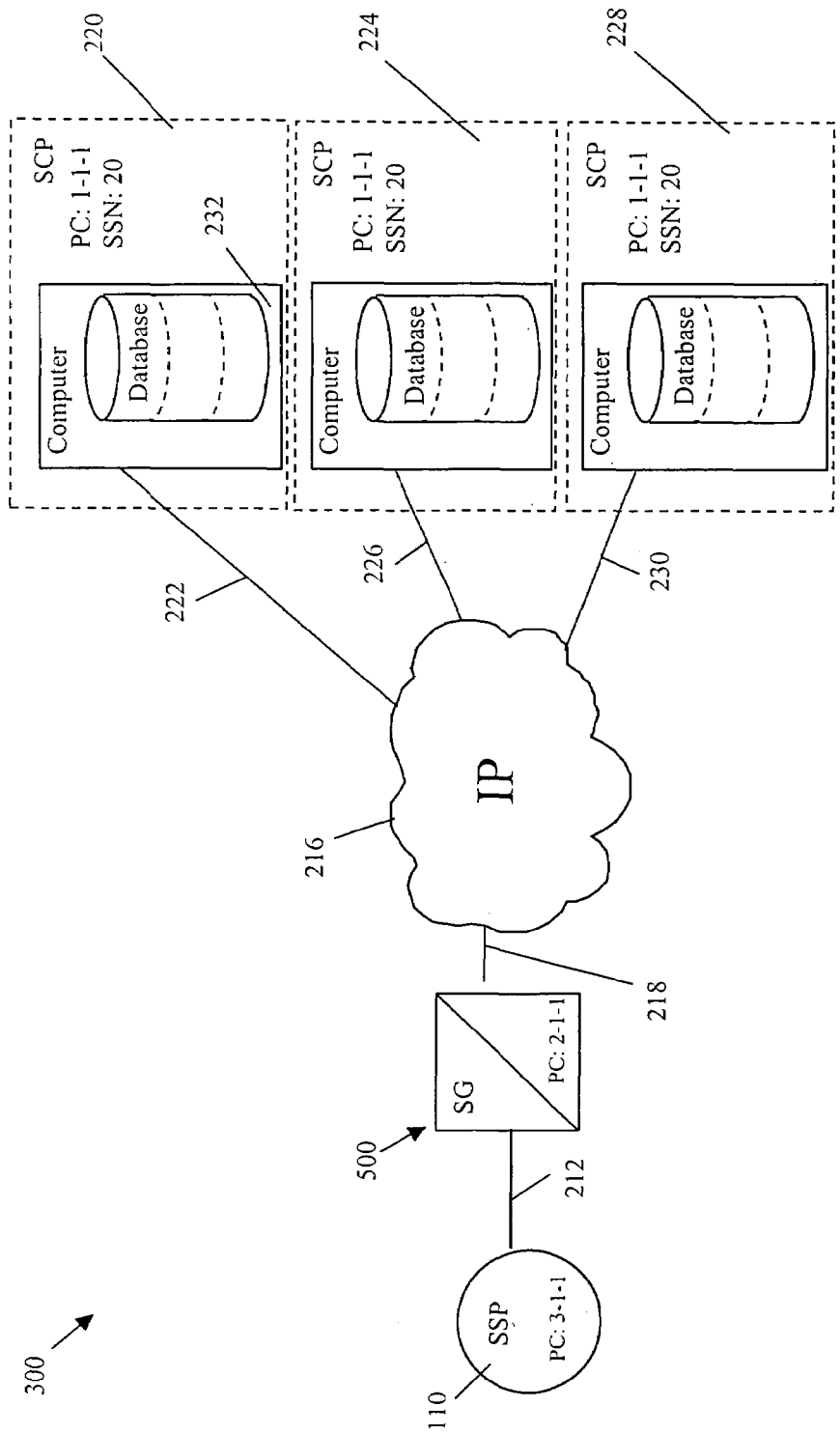
FIG. 9 is a network diagram illustrating another embodiment of the present invention where multiple SCP nodes each are assigned the same network address point code.

Illustrated in FIG. 9 is another typical telecommunications network, generally indicated by the numeral 300. As with the previously described telecommunications network 200, network 300 also includes an End Office or SSP 110, an FEP routing node 500, an IP data network 216, and three SCP nodes 220, 224, and 228. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via IP connections 222, 226 and 230 are SCPs 220, 224, and 228, respectively.

Figure 1:
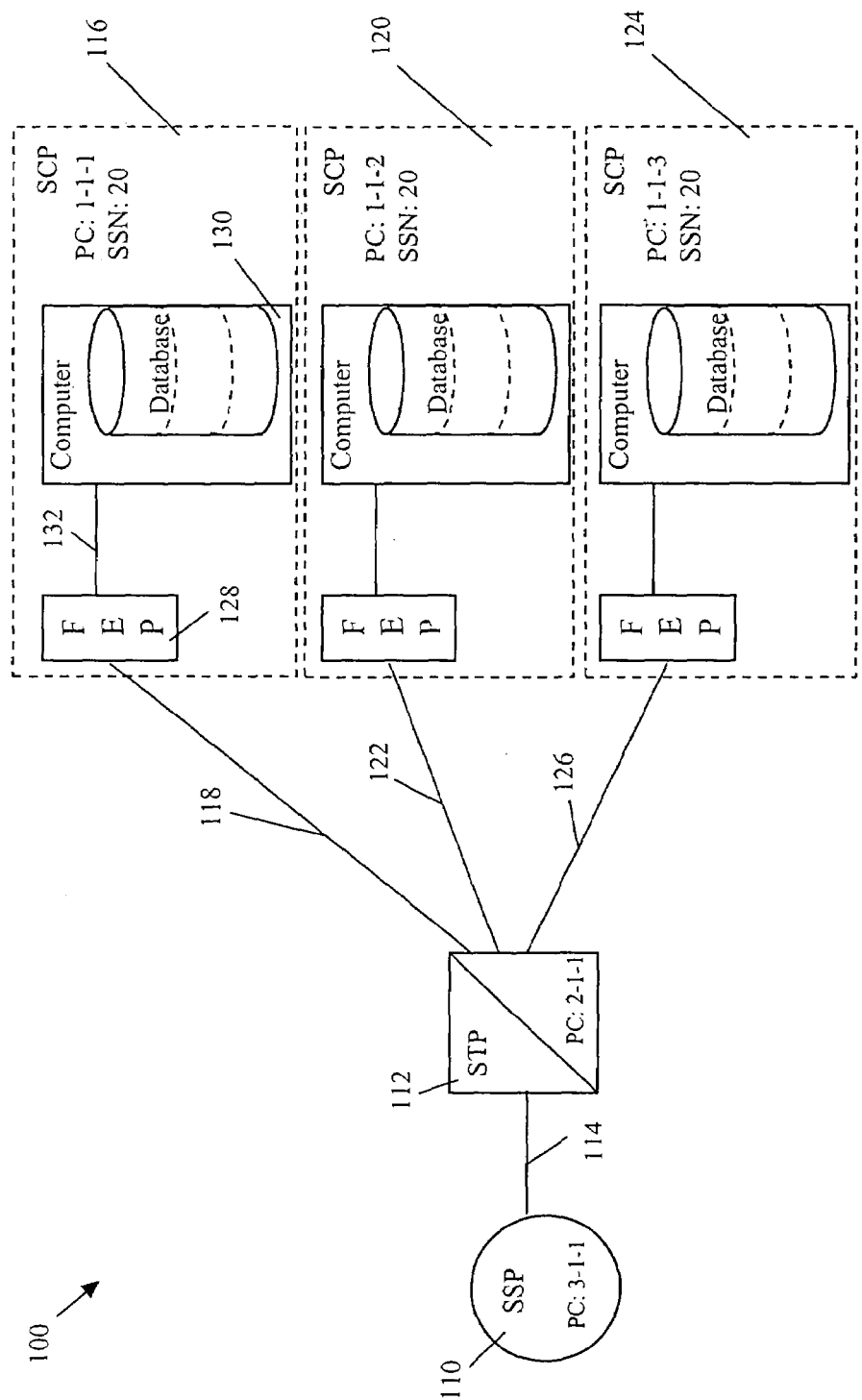
FIG. 1 is a network diagram illustrating a prior art telecommunications network that employs a signal transfer point (STP) node and multiple service control point (SCP) nodes.

Once again, when compared with the prior art network configuration illustrated in FIG. 1, it will be appreciated that the inclusion of FEP routing node 500 in FIG. 9 allows each of the provisioned SCPs 220, 224, and 228 to eliminate dedicated, internal FEP modules. Consequently, SCP 220 simply includes a computing platform 232 that serves a database back end processor. In a similar manner, SCP 224 and SCP 228 also include back end database computing platforms.

However, it will be appreciated that the network configuration shown in FIG. 9 is a slightly more complex implementation of an FEP routing node than that shown in FIG. 8. In the example shown in FIG. 9, all of the SCP nodes are identified by the same SS7 point code (1-1-1), which is different from the point code assigned to the FEP routing node (2-1-1) and all of the SCPs are provisioned with the same subsystem, SSN 20. However, as each of these SCP nodes is connected to the FEP routing node 500 via the IP data network 216, each individual SCP will still have a unique assigned IP address in the form of a Host name and Port.

As such, when FEP routing node 500 receives a TCAP query message from SSP 110 that is destined for the SCP with point code of 1-1-1 and SSN of 20, FEP routing node might make a decision to route based on the operational status or congestion status of the three SCPs 220, 224 and 228. Such load shedding or load sharing among the three similarly provisioned SCPs will ultimately lead to superior overall network performance. The FEP routing node 500 might further perform database protocol translation-type processing on the message, encapsulate the modified message in a properly addressed IP packet, and route the modified message on to the selected SCP. Once again, any additional processing that was previously performed by FEP 128 shown in FIG. 1 could also be performed by the FEP routing node 500.

Figure 10:
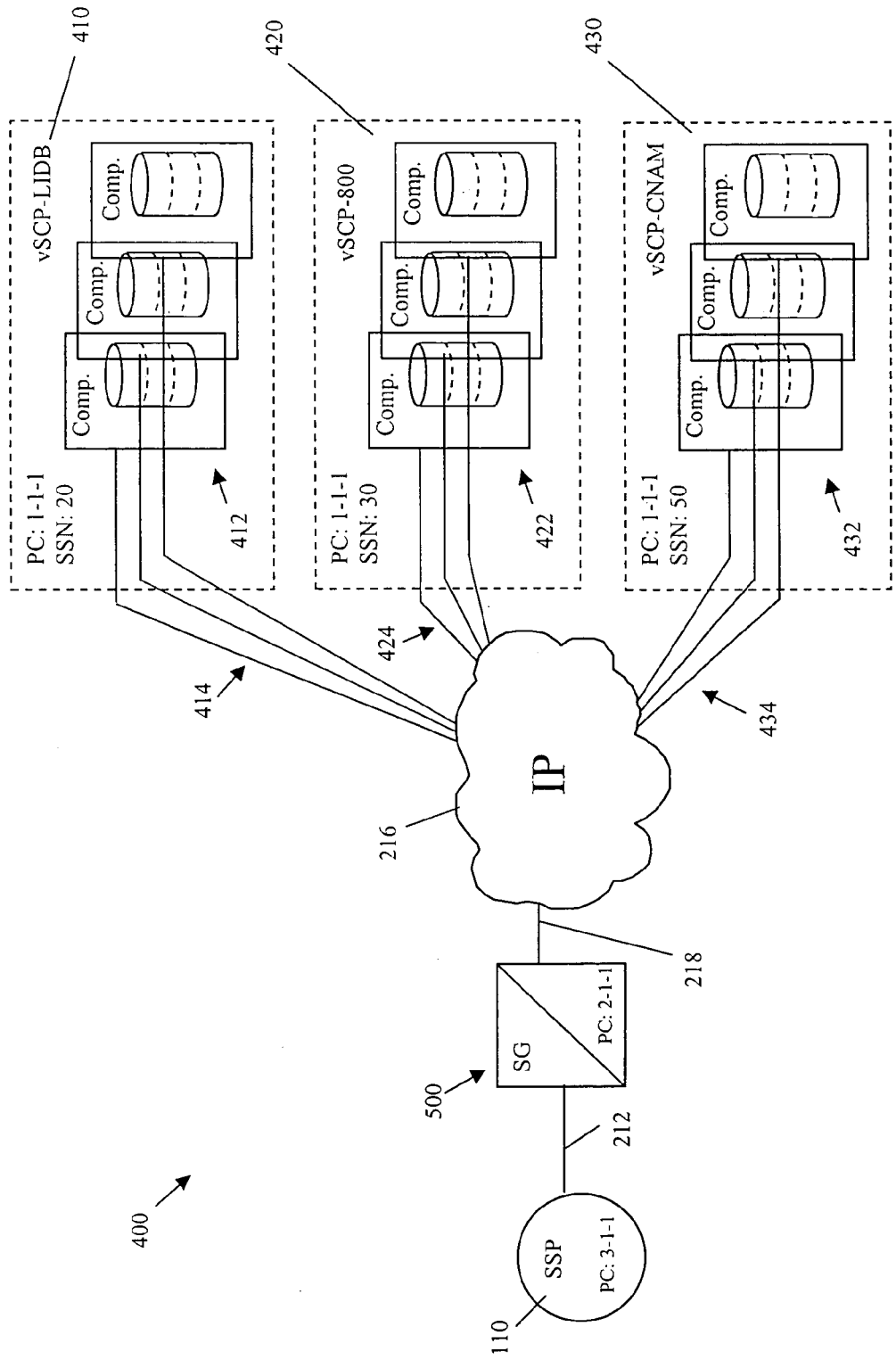
FIG. 10 is a network diagram illustrating another embodiment of the present invention where multiple virtual service control point (vSCP) nodes each are assigned the same network address point code.

Illustrated in FIG. 10 is yet another typical telecommunications network, generally indicated by the numeral 400. As with the previously described telecommunications network 200, network 400 also includes an end office or SSP 110, an FEP routing node 500, an IP data network 216, and three SCP nodes 410, 420, and 430. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via the plurality of IP connections 414, 424 and 434 are SCPs 410, 420, and 430, respectively. In this sample implementation, each SCP is comprised of multiple back end database processors which effectively form a series of virtual SCP (vSCP) nodes. More particularly, SCP 410 is comprised of a series of back end database processors generally indicated by the numeral 412, all of which are represented by a point code of 1-1-1 and subsystem of 20. In this example, it is assumed that SSN 20 of SCP 410 provides LIDB-type database information. SCP 420 is comprised of a series of back end database processors generally indicated by the numeral 422, all of which are represented by a point code of 1-1-1 and subsystem of 30. In this example, it is assumed that SSN 30 of SCP 420 provides 800 number-type database information. SCP 430 is comprised of a series of back end database processors generally indicated by the numeral 432, all of which are represented by a point code of 1-1-1 and subsystem of 50. In this example, it is assumed that SSN 50 of SCP 410 provides CNAM-type database information.

Once again, when compared with the prior art network configuration illustrated in FIG. 1, it will be appreciated that the inclusion of FEP routing node 500 in FIG. 10 allows each of the provisioned SCPs 410, 420, and 430 to eliminate dedicated, internal FEP modules that would have otherwise have been associated with each back end database processor.

It will be appreciated that the network configuration shown in FIG. 10 is a still slightly more complex implementation of an FEP routing node even than that shown in FIG. 9. In the example shown in FIG. 10, all of the SCP nodes are identified by the same SS7 point code (1-1-1), which is different from the point code assigned to the FEP routing node (2-1-1) yet each SCP node has a different subsystem provisioned for service. Once again, as each of the back end processors that comprise these SCP nodes is connected to the FEP routing node 500 via the IP data network 216, each individual back end processor of each SCP will still have a unique assigned IP address in the form of a host name and port.

As such, when FEP routing node 500 receives a TCAP query message from SSP 110 that is destined for the SCP with point code of 1-1-1 and SSN of 50, FEP routing node might make a decision to route based on the operational status or congestion status of the multiple back end processors 432 that are associated with SCP 430. Such load shedding or load sharing among multiple, similarly provisioned back end processors will ultimately lead to superior overall network performance. The FEP routing node 500 might further perform database protocol translation-type processing on the message, encapsulate the modified message in a properly addressed IP packet, and route the modified message on to the selected SCP back end processor. Once again, any additional processing that was previously performed by FEP 128 shown in FIG. 1 could also be performed by the FEP routing node 500.

Figure 11:
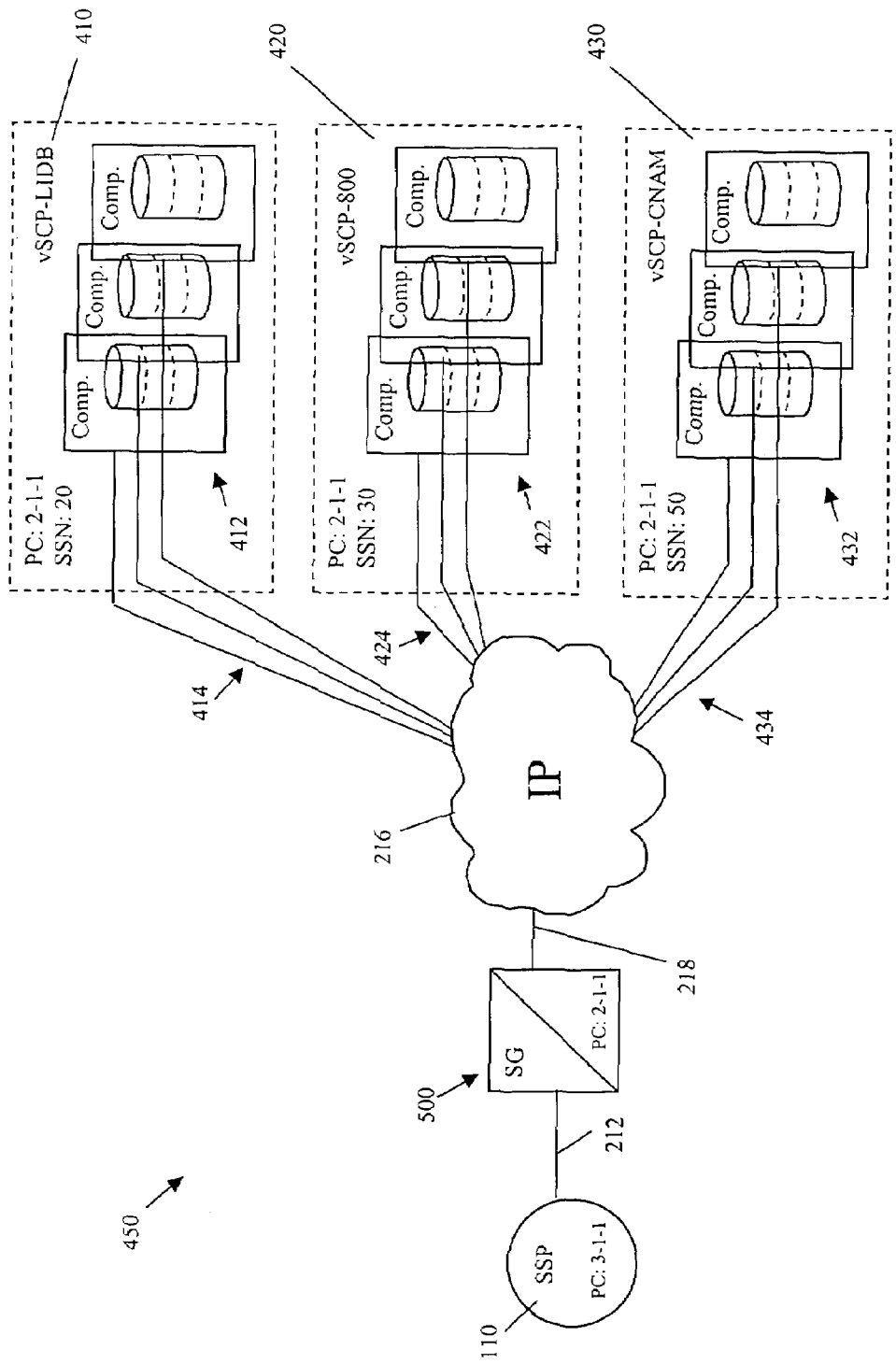
FIG. 11 is a network diagram illustrating another embodiment of the present invention where multiple vSCP nodes each are assigned the same network address point code as a packet router node.

Illustrated in FIG. 11 is still another typical telecommunications network, generally indicated by the numeral 450. As with the previously described telecommunications network 200, network 450 also includes an End Office or SSP 110, an FEP routing node 500, an IP data network 216, and three SCP nodes 410, 420, and 430. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via the plurality of IP connections 414, 424 and 434 are SCPs 410, 420, and 430, respectively. Once again, in this sample implementation, each SCP is comprised of multiple back end database processors which effectively form a series of virtual SCP (vSCP) nodes. More particularly, SCP 410 is comprised of a series of back end database processors generally indicated by the numeral 412, all of which are represented by a point code of 2-1-1 and subsystem of 20. In this example, it is assumed that SSN 20 of SCP 410 provides LIDB-type database information. SCP 420 is comprised of a series of back end database processors generally indicated by the numeral 422, all of which are represented by a point code of 2-1-1 and subsystem of 30. In this example, it is assumed that SSN 30 of SCP 420 provides 800 number-type database information. SCP 430 is comprised of a series of back end database processors generally indicated by the numeral 432, all of which are represented by a point code of 2- 1-1 and subsystem of 50. In this example, it is assumed that SSN 50 of SCP 410 provides CNAM-type database information.

Once again, when compared with the prior art network configuration illustrated in FIG. 1, it will be appreciated that the inclusion of FEP routing node 500 in FIG. 10 allows each of the provisioned SCPs 410, 420, and 430 to eliminate dedicated, internal FEP modules that would have otherwise have been associated with each back end database processor.

It will be appreciated that the network configuration shown in FIG. 11 is perhaps the most powerful implementation of an FEP routing node of the present invention. It should be noted, as mentioned above, that in the example shown in FIG. 11, all of the SCP nodes are identified by the same SS7 point code (2-1-1), which is identically the same point code assigned to the FEP routing node (2-1-1) yet each SCP node has a different subsystem provisioned for service. Once again, as each of the back end processors that comprise these SCP nodes is connected to the FEP routing node 500 via the IP data network 216, each individual back end processor of each SCP will still have a unique assigned IP address in the form of a host name and a port. Those skilled in the art of telecommunications network operation will appreciate the implications and significance of such a network addressing scheme. From a practical standpoint, such a network architecture allows network operators to simply address all query messages to an FEP routing node, where the intelligence resides to determine which SCP or database should receive any given query message. Thus, as SCP or database nodes are added to the network, only routing information stored in the FEP routing node need be updated to reflect the network architecture change. In other words, the SCP or database portion of the communications network becomes essentially transparent to any service provider launching database queries. All the service providers need specify is the type of database service that is being requested (e.g., a subsystem or translation type), and the point code of the FEP routing node.

As such, when FEP routing node 500 receives a TCAP query message from SSP 110 that is destined for the SCP with point code of 2-1-1 and SSN of 50, FEP routing node might make a decision to route based on the operational status or congestion status of the multiple back end processors 432 that are associated with SCP 430. Such load shedding or load sharing among multiple, similarly provisioned back end processors will ultimately lead to superior overall network performance. The FEP routing node 500 might further perform database protocol translation-type processing on the message, encapsulate the modified message in a properly addressed IP packet, and route the modified message on to the selected SCP back end processor. Once again, any additional processing that was previously performed by FEP 128 shown in FIG. 1 could also be performed by the FEP routing node 500.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network element for providing service control point (SCP) or database node front end processing (FEP) service and routing data packets through a communications network, the network element comprising:
    (a) a first module capable of transmitting data packets to and receiving data packets from a communications network, wherein the first module is adapted to receive a data packet from the communications network;
    (b) a second module for receiving the data packet and for forwarding the data packet to one of a plurality of SCP or database nodes being separate from the first module and being without individual front end processors, wherein the network element is adapted to provide FEP service for the SCP or database nodes and to eliminate the need for the SCP or database nodes to have individual front end processors.

2. The network element of claim 1 wherein the received data packet is a signaling system 7 (SS7) signaling message.

3. The network element of claim 2 wherein the SS7 signaling message is a transaction capabilities application part (TCAP) message signaling unit (MSU).

4. The network element of claim 3 wherein the TCAP MSU contains a database query message.

5. The network element of claim 1 wherein the communications network is an SS7 network.

6. The network element of claim 1 wherein the communications network is an Internet protocol (IP) network.

7. The network element of claim 1 wherein the communications network is an asynchronous transfer mode (ATM) network.

8. The network element of claim 1 wherein the first module is a signaling system 7 (SS7) link interface module (LIM).

9. The network element of claim 1 wherein the second module is an Internet protocol (IP) database communication module (DCM).

10. The network element of claim 1 comprising a database access control (DAC) database, wherein the DAC database includes a plurality of records and each DAC database record includes an IP network address associated with one of the SCP or database nodes.

11. The network element of claim 10 wherein the DAC database includes a plurality of records and each DAC database record includes operational status information associated with one of the SCP or database nodes.

12. The network element of claim 10 wherein the DAC database includes a plurality of records and each DAC database record includes ownership information associated with one of the SCP or database nodes.

13. The network element of claim 10 wherein the DAC database includes a plurality of records and each DAC database record includes database protocol information associated with one of the SCP or database nodes.

14. The network element of claim 10 wherein the DAC database includes a plurality of records and each DAC database record includes service type identification information associated with one of the SCP or database nodes.

15. The network element of claim 14 wherein the service type identification information identifies an advanced intelligent network (AIN) service.

16. The network element of claim 14 wherein the service type identification information is a translation type (TT) value.

17. The network element of claim 14 wherein the service type identification information is a subsystem number (SSN).

18. The network element of claim 14 wherein the service type identification information identifies a calling name (CNAM) service.

19. The network element of claim 14 wherein the service type identification information identifies a line information database (LIDB) service.

20. The network element of claim 14 wherein the service type identification information identifies a toll free number (800) service.

21. The network element of claim 14 wherein the service type identification information identifies a local number portability (LNP) service.

22. The network element of claim 14 wherein the service type identification information identifies a presence service.

23. The network element of claim 10 wherein the DAC database is integral with and contained within the network element.

24. The network element of claim 10 wherein the DAC database is located on an external database server communicatively coupled to the network element.

25. The network element of claim 10 wherein data that comprises the DAC database is maintained in high speed, random access memory.

26. The network element of claim 10 wherein data that comprises the DAC database is maintained on high speed, optical disc storage media.

27. The network element of claim 1 including a protocol translation process for modifying the received data packet to include predetermined database protocol information.

28. The network element of claim 27 wherein the protocol translation process is capable of translating an SCP or database query to or from a structured query language (SQL) database protocol.

29. The network element of claim 27 wherein the protocol translation process is capable of translating an SCP or database query to or from an open database connectivity (ODBC) database protocol.

30. The network element of claim 1 wherein the comprising a database access control process for examining a destination network address in the received data packet to identify one of the SCP or database nodes to which the packet is destined.

31. The network element of claim 30 wherein the destination network address is an SS7 destination point code (DPC) and subsystem (SSN).

32. The network element of claim 31 wherein, responsive to the SS7 DPC being the same as an SS7 PC assigned to the network element, the database access control process is adapted to forward the data packet to one of the SCP or database nodes.

33. The network element of claim 31 wherein the SSN corresponds to a SSN that is provisioned for FEP service.

34. The network element of claim 1 comprising a database access control process for examining a translation type (TT) value in the received data packet to identify one of the SCP or database nodes which the packet is destined.

35. The network element of claim 1 comprising a database access control process for examining a subsystem number (SSN) value in the received data packet to identify one of the SCP or database nodes to which the packet is destined.

36. The network element of claim 1 wherein providing FEP service for a plurality of SCP or database nodes comprises providing front end processing service at a signal transfer point (STP).

37. A method for providing service control point (SCP) or database node front end processing (FEP) service and for routing a data packet in a communications network, the method comprising:
providing, from a first network element having a first SS7 point code (PC), FEP service for a plurality of SCPs being separate from the first network element and being without individual front end processors, wherein providing FEP service includes:
(a) at the first network element receiving a data packet having a first SS7 destination point code (DPC) from a first communications network;
(b) determining whether the received data packet is intended for an SCP or database node that is provisioned to receive front end processing (FEP) service;
(c) in response to determining that the received data packet is intended for an SCP or database node that is provisioned to receive FEP service, modifying the received data packet; and
(d) transmitting the modified data packet to one of the SCPs over a second communications network.

38. The method of claim 37 wherein comprising performing a lookup in a database access control (DAC) database based on key information in the received data packet to identify the SCP to which the data packet should be routed, wherein the key information includes subsystem number (SSN) value.

39. The method of claim 37 wherein the received data packet is a signaling system 7 (SS7) signaling message.

40. The method of claim 39 wherein the SS7 signaling message is a transaction capabilities application part (TCAP) message signaling unit (MSU).

41. The method of claim 40 wherein the TCAP MSU contains an SCP or database query message.

42. The method of claim 37 wherein the first communications network is an SS7 network.

43. The method of claim 37 wherein the second communications network is an Internet protocol (IP) network.

44. The method of claim 37 wherein determining whether the received data packet is destined for an SCP or database node that is provisioned to receive front end processing (FEP) service includes examining the DPC value in the received data packet.

45. The method of claim 44 wherein determining whether the received data packet is destined for an SCP or database node that is provisioned to receive front end processing (FEP) service further includes examining a destination subsystem (SSN) value in the received data packet.

46. The method of claim 45 wherein the destination SSN value corresponds to a SSN that is provisioned for FEP service.

47. The method of claim 44 wherein the DPC is the same as the PC assigned to the first network element.

48. The method of claim 37 wherein comprising performing a lookup in a database access control (DAC) database based on key information in the received data packet to identify the SCP to which the data packet should be routed, wherein the key information includes the first DPC and a subsystem number (SSN) value.

49. The method of claim 37 wherein comprising performing a lookup in a database access control (DAC) database based on key information in the received data packet to identify the SCP to which the data packet should be routed, wherein the key information includes a translation type (TT) value.

50. The method of claim 37 wherein modifying the received data packet includes modifying a packet routing label in the received data packet based on information returned from a database access control (DAC) database.

51. The method of claim 50 wherein modifying the routing label includes modifying the routing label based on SCP or database node operational status information contained within the DAC database.

52. The method of claim 50 wherein modifying the routing label includes modifying the routing label based on SCP or database node congestion status information contained within the DAC database.

53. The method of claim 50 wherein modifying the routing label includes modifying the routing label based on SCP or database node ownership information contained within the DAC database.

54. The method of claim 50 wherein modifying the routing label includes modifying the routing label to include a destination IP network address.

55. The method of claim 37 wherein modifying the received data packet includes changing a protocol of a database query statement contained in the received packet.

56. The method of claim 55 wherein changing a protocol includes changing the protocol based on SCP or database node protocol information contained within a database.

57. The method of claim 37 wherein providing FEP service from the first network element comprises providing front end processing service from a signal transfer point (STP).

58. A network element for providing service control point (SCP) or database node front end processing (FEP) service and routing data packets through a communications network, the network element comprising:
(a) a first module capable of receiving data packets from a first communications network and transmitting data packets to a second communications network, wherein the first module is adapted to receive a data packet from the first communication network;
(b) a second module for receiving the data packet and for forwarding the data packet to one of a plurality of SCP or database nodes being separate from the first module and being without individual front end processors, wherein the network element is adapted to provide FEP service for the SCP or database nodes and to eliminate the need for the SCP or database nodes to have individual front end processors.

59. The network element of claim 58 comprising a database access control process for examining a subsystem number (SSN) value in the received data packet to identify one of the SCP or database nodes to which the packet is destined.

60. The network element of claim 58 wherein the received data packet is a signaling system 7 (SS7) signaling message.

61. The network element of claim 60 wherein the SS7 signaling message is a transaction capabilities application part (TCAP) message signaling unit (MSU).

62. The network element of claim 61 wherein the TCAP MSU contains a database query message.

63. The network element of claim 58 wherein the first communications network is an SS7 network.

64. The network element of claim 58 wherein the second communications network is an Internet protocol (IP) network.

65. The network element of claim 58 comprising a database access control (DAC) database, wherein the DAC database includes a plurality of records and each DAC database record includes an IP network address associated with one of the SCP or database nodes.

66. The network element of claim 58 comprising a database access control (DAC) database, wherein the DAC database includes a plurality of records and each DAC database record includes operational status information associated with one of the SCP or database nodes.

67. The network element of claim 58 comprising a database access control (DAC) database, wherein the DAC database includes a plurality of records and each DAC database record includes ownership information associated with one of the SCP or database nodes.

68. The network element of claim 58 comprising a database access control (DAC) database, wherein the DAC database includes a plurality of records and each DAC database record includes database protocol information associated with one of the SCP or database nodes.

69. The network element of claim 58 comprising a database access control (DAC) database, wherein the DAC database includes a plurality of records and each DAC database record includes service type identification information associated with one of the SCP or database nodes.

70. The network element of claim 69 wherein the service type identification information is a subsystem number (SSN) value.

71. The network element of claim 69 wherein the service type identification information is a translation type (TT) value.

72. The network element of claim 69 wherein the service type identification information identifies a calling name (CNAM) service.

73. The network element of claim 69 wherein the service type identification information identifies a line information database (LIDB) service.

74. The network element of claim 69 wherein the service type identification information identifies a toll free number (800) service.

75. The network element of claim 69 wherein the service type identification information identifies a local number portability (LNP) service.

76. The network element of claim 69 wherein the service type identification information identifies a presence service.

77. The network element of claim 58 comprising a database access control (DAC) database for storing information regarding the SCP or database nodes, wherein the DAC database is integral with and contained within the network element.

78. The network element of claim 58 comprising a database access control (DAC) database for storing information regarding the SCP or database nodes, wherein the DAC database is located on an external database server that is communicatively coupled to the network element.

79. The network element of claim 58 comprising a database access control (DAC) database for storing information regarding the SCP or database nodes, wherein data that comprises the DAC database is maintained in high speed, random access memory.

80. The network element of claim 58 comprising a database access control (DAC) database for storing information regarding the SCP or database nodes, wherein data that comprises the DAC database is maintained on high speed, optical disc storage media.

81. The network element of claim 58 including a DAC protocol translation process.

82. The network element of claim 81 wherein the DAC protocol translation process is capable of translating an SCP or database query to or from a structured query language (SQL) database protocol.

83. The network element of claim 81 wherein the DAC protocol translation process is capable of translating an SCP or database query to or from an open database connectivity (ODBC) database protocol.

84. The network element of claim 58 comprising a database access control process for examining a destination network address in the received data packet to identify one of the SCP or database nodes to which the packet is destined.

85. The network element of claim 84 wherein the destination network address is an SS7 destination point code (DPC) and a subsystem (SSN).

86. The network element of claim 83 wherein the SS7 DPC is the same as an SS7 PC assigned to the network element.

87. The network element of claim 83 wherein the SSN corresponds to an SSN that is provisioned for FEP service.

88. The network element of claim 58 comprising a database access control process for examining a translation type (TT) value in the received data packet to identify one of the SCP or database nodes to which the packet is destined.

89. The network element of claim 58 wherein providing FEP service for a plurality of SCP or database nodes comprises providing front end processing service at a signal transfer point (STP).

90. A network routing element for routing signaling messages having a first signaling system 7 (SS7) network address, the network routing element being adapted to receive messages addressed to the first SS7 network address intended for processing by a service control point (SCP) or database node that resides in an Internet protocol (IP) network, the network routing element comprising:
  (a) a first module capable of receiving data packets from a communications network and transmitting data packets to a second communications network, wherein the first module is adapted to receive a data packet from the first communications network;
  (b) a second module for receiving the data packet and for forwarding the data packet to one of a plurality of SCP or database nodes in the second communications network, the SCP or database nodes being separate from the first module and being without individual front end processors, wherein the second communications network comprises an IP network, and wherein the network element is adapted to provide FEP service for the SCP or database nodes and to eliminate the need for the SCP or database nodes to have individual front end processors.

91. The network element of claim 90 comprising a database access control process for examining a subsystem number (SSN) in the received data packet to identify one of the SCP or database nodes to which the packet is destined.

92. The network element of claim 90 wherein the received data packet is a signaling system 7 (SS7) signaling message.

93. The network element of claim 92 wherein the SS7 signaling message is a transaction capabilities application part (TCAP) message signaling unit (MSU).

94. The network element of claim 93 wherein the TCAP MSU contains a database query message.

95. The network element of claim 90 wherein the first communications network is an SS7 network.

96. The network element of claim 90 wherein the first communications network is an Internet protocol (IP) network transporting IP encapsulated SS7 MSUs.

97. The network element of claim 90 comprising a database access control (DAC) database for identifying one of the SCP or database nodes to which the data packet should be forwarded, wherein the DAC database includes a plurality of records and each DAC database record includes an IP network address associated with an SCP or database node.

98. The network element of claim 90 comprising a database access control (DAC) database for identifying one of the SCP or database nodes to which the data packet should be forwarded, wherein the DAC database is integral with and contained within the network element.

99. The network element of claim 90 comprising a database access control (DAC) database for identifying one of the SCP or database nodes to which the data packet should be forwarded, wherein the DAC database is located on an external database server that is communicatively coupled to the network element.

100. The network element of claim 90 comprising a database access control (DAC) database for identifying one of the SCP or database nodes to which the data packet should be forwarded, wherein data that comprises the DAC database is maintained in high speed, random access memory.

101. The network element of claim 90 comprising a database access control (DAC) database for identifying one of the SCP or database nodes to which the data packet should be forwarded, wherein data that comprises the DAC database is maintained on high speed, optical disc storage media.

102. The network element of claim 90 including a database access control (DAC) protocol translation process for translating the protocol of messages sent to one of the SCP or database nodes.

103. The network element of claim 102 wherein the DAC protocol translation process is capable of translating an SCP or database query to or from a structured query language (SQL) database protocol.

104. The network element of claim 102 wherein the DAC protocol translation process is capable of translating an SCP or database query to or from an open database connectivity (ODBC) database protocol.

105. The network element of claim 90 comprising a database access control process for examining a destination network address in the received data packet to identify one of the SCP or database nodes to which the packet is destined.

106. The network element of claim 105 wherein the destination network address is an SS7 destination point code (DPC) and subsystem (SSN).

107. The network element of claim 106 wherein the SS7 DPC is the same as the first SS7 PC assigned to the network element.

108. The network element of claim 90 comprising a database access control process for examining a translation type (TT) value in the received data packet to identify one of the SCP or database nodes to which the packet is destined.

109. The network routing element of claim 90 wherein providing FEP service for a plurality of SCP or database nodes comprises providing front end processing service at a signal transfer point (STP).

* * * * *

UNITED STATES PATENT AND TRADEMARK OFFICE
CERTIFICATE OF CORRECTION

| | | |
|---|---|---|
| PATENT NO. | : 6,944,184 B1 | Page 1 of 1 |
| APPLICATION NO. | : 09/537835 | |
| DATED | : September 13, 2005 | |
| INVENTOR(S) | : Miller et al. | |

It is certified that error appears in the above-identified patent and that said Letters Patent is hereby corrected as shown below:

Title page
item (63)
replace "which"
with --and--

Signed and Sealed this
Twentieth Day of March, 2012

David J. Kappos
*Director of the United States Patent and Trademark Office*